(12) United States Patent
Krishna et al.

(10) Patent No.: US 11,568,003 B2
(45) Date of Patent: Jan. 31, 2023

(54) REFINED SEARCH WITH MACHINE LEARNING

(71) Applicant: Google LLC, Mountain View, CA (US)

(72) Inventors: Golden Gopal Krishna, Berkeley, CA (US); Carl Magnus Borg, San Francisco, CA (US); Miroslav Bojic, San Francisco, CA (US); Henry Owen Newton-Dunn, Mountain View, CA (US); Jacob M. Klinker, Mountain View, CA (US); Mindy Pereira, Santa Clara, CA (US); Devin Mancuso, San Francisco, CA (US); Daniel June Hyung Park, Sunnyvale, CA (US); Lily Sin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 170 days.

(21) Appl. No.: 16/008,021

(22) Filed: Jun. 13, 2018

(65) Prior Publication Data
US 2019/0188322 A1 Jun. 20, 2019

Related U.S. Application Data

(60) Provisional application No. 62/599,603, filed on Dec. 15, 2017.

(51) Int. Cl.
*G06F 16/951* (2019.01)
*G06F 16/33* (2019.01)
*G06N 20/00* (2019.01)

(52) U.S. Cl.
CPC .......... *G06F 16/951* (2019.01); *G06F 16/334* (2019.01); *G06N 20/00* (2019.01)

(58) Field of Classification Search
CPC ...... G06F 16/951; G06F 16/334; G06N 20/00
See application file for complete search history.

(56) References Cited

U.S. PATENT DOCUMENTS

| | | | |
|---|---|---|---|
| 7,503,012 B2 | 3/2009 | Chen et al. | |
| 7,801,885 B1 * | 9/2010 | Verma | G06F 16/9535 707/713 |
| 8,520,000 B2 | 8/2013 | Duncker et al. | |

(Continued)

FOREIGN PATENT DOCUMENTS

WO   2019125543   6/2019

OTHER PUBLICATIONS

"International Search Report and Written Opinion", PCT Application No. PCT/US2018/047122, dated Oct. 22, 2018, 17 pages.

(Continued)

*Primary Examiner* — Mark D Featherstone
*Assistant Examiner* — Samuel C Sharpless, III
(74) *Attorney, Agent, or Firm* — McDonnell Boehnen Hulbert & Berghoff LLP

(57) ABSTRACT

This document describes techniques and devices for a refined search with machine learning. These techniques improve computer-aided searches through enabling selection of search criteria used in a prior search and providing a (Continued)

refined search result based on that selection. Furthermore, a machine-learning component of a search engine can be altered to improve future search results based on the selection and an indication of the desirability of the refined search result.

20 Claims, 10 Drawing Sheets

(56) References Cited

U.S. PATENT DOCUMENTS

| | | |
|---|---|---|
| 9,684,546 B2 | 6/2017 | Peacock et al. |
| 10,013,783 B1 | 7/2018 | Bhat et al. |
| 10,333,873 B2 | 6/2019 | Perez et al. |
| 10,620,923 B2 | 4/2020 | Allan et al. |
| 10,783,013 B2 | 9/2020 | Krishna et al. |
| 10,846,109 B2 | 11/2020 | Krishna et al. |
| 10,970,096 B2 | 4/2021 | Krishna et al. |
| 2007/0156647 A1* | 7/2007 | Shen .................. G06F 16/9535 |
| 2009/0144262 A1* | 6/2009 | White .................. G06F 16/3338 |
| 2011/0295847 A1* | 12/2011 | Cucerzan ............... G06F 16/951 707/723 |
| 2011/0302521 A1 | 12/2011 | Jiang et al. |
| 2012/0158702 A1* | 6/2012 | Kumar .................. G06F 16/215 707/723 |
| 2012/0159395 A1 | 6/2012 | Deutsch et al. |
| 2013/0218836 A1 | 8/2013 | Sullivan et al. |
| 2013/0326562 A1* | 12/2013 | Bi ...................... H04N 5/44543 725/58 |
| 2015/0058318 A1* | 2/2015 | Blackwell ............. G06F 16/248 707/722 |
| 2015/0128058 A1 | 5/2015 | Anajwala |
| 2016/0360382 A1 | 12/2016 | Gross et al. |
| 2018/0060982 A1* | 3/2018 | Milles ................. G06F 16/9535 |
| 2018/0233141 A1 | 8/2018 | Solomon et al. |
| 2018/0365899 A1 | 12/2018 | Wolf et al. |
| 2019/0188013 A1 | 6/2019 | Krishna et al. |
| 2019/0188059 A1 | 6/2019 | Krishna et al. |
| 2020/0364099 A1 | 11/2020 | Krishna et al. |
| 2021/0004247 A1 | 1/2021 | Krishna et al. |
| 2021/0208908 A1 | 7/2021 | Krishna et al. |

OTHER PUBLICATIONS

"International Search Report and Written Opinion", PCT Application No. PCT/US2018/050295, dated Nov. 22, 2018, 15 pages.

"International Search Report and Written Opinion", PCT Application No. PCT/US2018/050701, dated Nov. 27, 2018, 12 pages.

"Process Explorer", https://en.wikipedia.org/wiki/Process_Explorer; Retrieved from Internet on Nov. 9, 2018, 3 pages.

"Final Office Action", U.S. Appl. No. 16/112,400, dated Feb. 3, 2020, 9 Pages.

"Non-Final Office Action", U.S. Appl. No. 15/974,284, dated Dec. 18, 2019, 18 Pages.

"First Action Interview Office Action", U.S. Appl. No. 16/112,400, dated Sep. 16, 2019, 3 Pages.

"Pre-Interview Communication", U.S. Appl. No. 16/122,400, dated Jun. 25, 2019, 3 pages.

"Final Office Action", U.S. Appl. No. 15/974,284, dated Apr. 15, 2020, 23 Pages.

"International Preliminary Report on Patentability", PCT Application No. PCT/US2018/050701, dated Jul. 2, 2020, 6 pages.

"Notice of Allowance", U.S. Appl. No. 16/112,400, dated May 13, 2020, 8 Pages.

"Corrected Notice of Allowance", U.S. Appl. No. 15/974,284, dated Oct. 26, 2020, 3 pages.

"Notice of Allowance", U.S. Appl. No. 17/027,255, dated Dec. 23, 2020, 7 pages.

"International Preliminary Report on Patentability", Application No. PCT/US2018/047122, dated Jun. 25, 2020, 12 pages.

"International Preliminary Report on Patentability", Application No. PCT/US2018/050295, dated Jun. 25, 2020, 9 pages.

"Notice of Allowance", U.S. Appl. No. 15/974,284, dated Jul. 27, 2020, 6 Pages.

"Corrected Notice of Allowance", U.S. Appl. No. 17/027,255, dated Mar. 12, 2021, 2 pages.

"Foreign Office Action", EP Application No. 18782839.7, dated Feb. 3, 2021, 5 pages.

"Foreign Office Action", EP Application No. 18782851.2, dated Jun. 4, 2021, 5 pages.

"Foreign Office Action", EP Application No. 18773890.1, dated Oct. 14, 2021, 5 pages.

"Notice of Allowance", U.S. Appl. No. 16/985,935, dated Dec. 10, 2021, 10 pages.

* cited by examiner

REFINED SEARCH WITH MACHINE LEARNING

RELATED APPLICATION

This application claims priority under 35 U.S.C. § 119(e) to U.S. Provisional Patent Application 62/599,603, filed on Dec. 15, 2017, which is incorporated herein by reference in its entirety.

BACKGROUND

Computer-aided searches are not only commonplace for billions of people, they are nearly essential in many people's day-to-day lives. Because of this, conventional search techniques use complex search algorithms to provide search results that are better and better tailored to what a person seeks.

Even with these complex search algorithms, however, conventional search techniques can fail to provide a desired result. This can be due to a lack of information, or, more commonly, a failure to properly use the different parts of the information, such as which terms to confidence higher than others, and how to correlate different terms and user actions to discern what matters most and how to use them to gain the desired result. Assume, for example, that a person has been making phone calls to various businesses in the last few minutes, and then enters a search query for "medical providers." A search engine may decide that the person is wanting to make a phone call to his or her insurance provider or local physician, rather than to an emergency room or ambulance service, by using the prior business calls as search criteria along with the search terms. Assume, however, that the provided results—the person's insurance provider and local physician—are not the desired result. In this example and often in billions of searches made worldwide, the result does not provide what the person desired.

This background description is provided for the purpose of generally presenting the context of the disclosure. Unless otherwise indicated herein, material described in this section is neither expressly nor impliedly admitted to be prior art to the present disclosure or the appended claims.

SUMMARY

This document describes techniques and devices for a refined search with machine learning. These techniques improve computer-aided searches through enabling selection of search criteria used in a prior search and providing a refined search result based on that selection. Furthermore, a machine-learning component of a search engine can be altered to improve future search results based on the selection and an indication of the desirability of the refined search result.

In one aspect, a method is described for determining, based on multiple search criteria, search results and presenting the search results. With the results presented, selectable items associated with the multiple search criteria used to determine the results are also presented, and one of these selectable items is received through selection. Responsive to receipt of the selected item, the method determines refined search results, the refined search results based on a search criterion associated with the selected item and at least one other of the multiple search criteria, after which the refined search results are presented.

In another aspect, a method is described for receiving selection of one of multiple search criteria, the multiple search criteria previously used to generate a search result using a search engine, the search result previously or concurrently provided through a device at which selection of the one of the multiple search criteria is received. Then, a positive or negative indication for a refined search result is received, the refined search result generated based on the selected search criteria, the refined search result previously or concurrently provided through the device at which the positive or negative indication for the refined result is determined. The method may then alter the search engine based on the selected search criteria, the multiple search criteria, and the positive or negative indication for the refined search result.

In still another aspect, a system is described that includes one or more computer processors and one or more computer-readable media. The media includes instructions that, responsive to execution by the one or more computer processors, performs operations. The operations include determining, using a search engine and based on multiple search criteria, search results and providing the search results to a user device for display on the user device. Then, from the user device, selection of one of the multiple search criteria with which to perform a revised search is received. Responsive to receipt of the selected search criteria, the operations perform the revised search using the search engine and based on the selected search criteria and one or more other of the multiple search criteria, the performance providing refined search results to the user device for display on the user device. A positive or negative indication of a desirability of the refined search results is received from the user device. The operations alter, based on the positive or negative indication and the selected search criteria, the search engine, the alteration effective to alter the search results for a later determination based on the same multiple search criteria.

This summary is provided to introduce simplified concepts concerning refined search with machine learning, which are further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of techniques and devices enabling a refined search with machine learning are described with reference to the following drawings. The same numbers are used throughout the drawings to reference like features and components.

DETAILED DESCRIPTION

Overview

Figure 1:
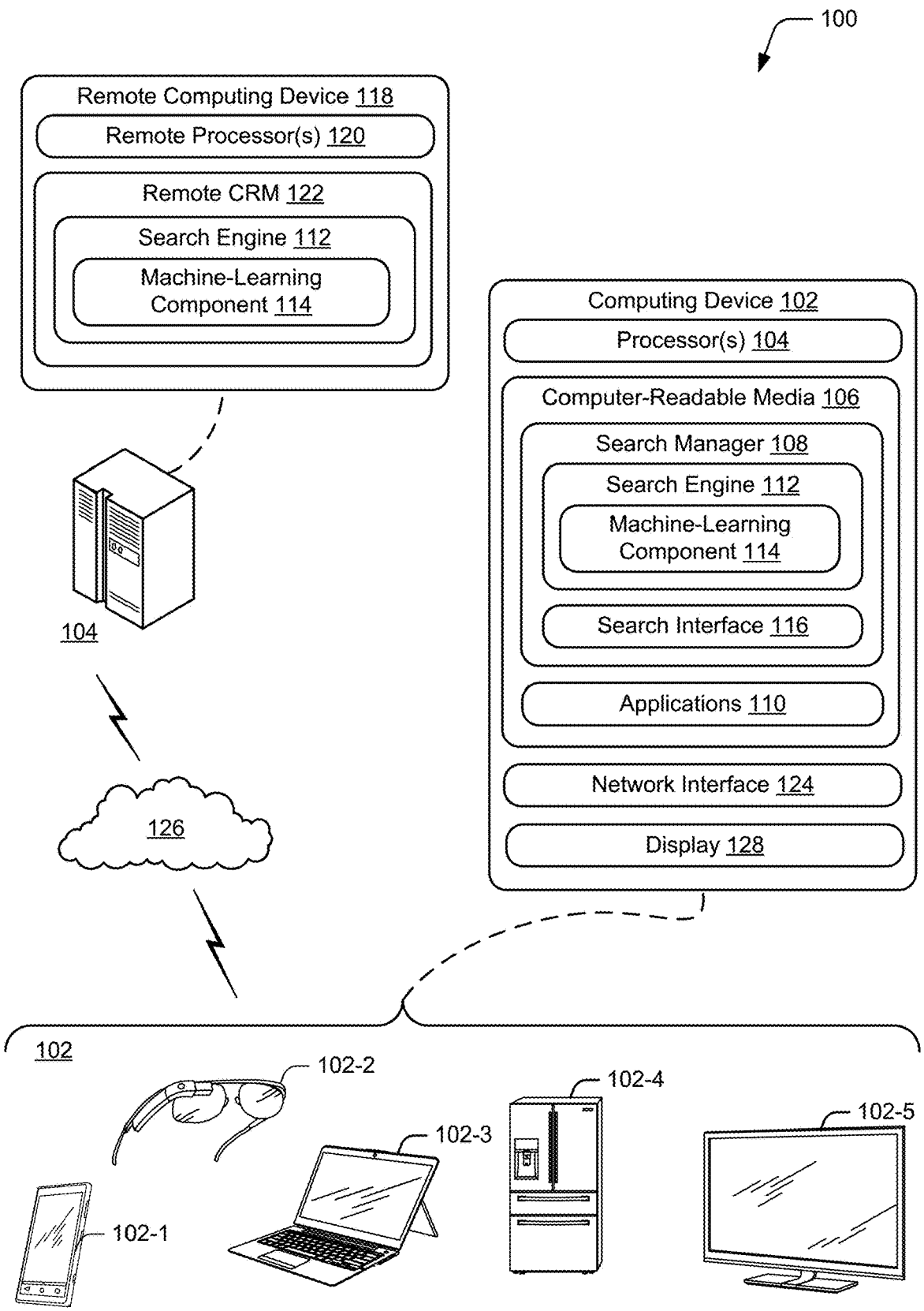
FIG. 1 illustrates an example environment in which a refined search with machine learning can be implemented.

This document describes techniques enabling a refined search with machine learning. These techniques improve computer-aided searches through enabling selection of search criteria used in a prior search and providing a refined search result based on that selection. Furthermore, a machine-learning component of a search engine can be altered to improve future search results based on the selection and an indication of the desirability of the refined search result.

Consider, for example, a case where a person selects to view an article on a web page. This user action is sufficient for a search engine to provide a search result based on the title of the article and text within the article. Assume that a user selects, on the Gotham Times website, to read an article about what to do if you have a day and a half to visit Oakland, Calif. Assume that the search engine uses the term Oakland from the title and four terms from within the article, Cesar Chavez Park, Julia Morgan, the Oakland Basketball Team, and Jim's Candy Corn. The search results are primarily based on the term Oakland and provide two selectable webpages associated with Oakland, that of TripGuru and Info-Pedia. Thus, in this case the user action, and data about the action, are used as search criteria, rather than typing in search terms. The search results are volunteered by the search engine for what the search engine determines to be other information in which the user is likely to be interested. Assume, however, that these are not helpful, as is often the case, and instead the user does not have any interest in TripGuru's or Info-Pedia's information about Oakland, Calif. In such a case, screen real estate is used, computing resources are used, and often wireless bandwidth is consumed, all to provide worthless information.

In contrast, consider the techniques for refined search and machine learning, which either provide a better result up front based on prior machine learning, or instead provide an easy-to-use way to refine the search. Assume that the techniques highlight, from the Gotham Times article, the other four terms that were of lower importance. The techniques can make each of these an easily selectable, visual control (e.g., a button), by which to up-confidence that term. Assume that the user taps on Julia Morgan, after which a refined search is presented that shows an Info-Pedia article about Hearst Castle, for which Julia Morgan was an architect, and a mapping application's interface to select directions to drive to the Hearst Castle. Not only is the refined search valuable to the user, but the selection of Julia Morgan can be used to alter and improve the search engine. The next time a person reads the Gotham Times article on Oakland, Calif., the confidence of Julia Morgan may be higher than before. In this way the techniques provide for refined searches and can improve a search engine through machine learning of this and other users' refined-search selections.

This document now turns to an example environment, after which example methods, user interfaces, and computing system are described.

Example Environment

FIG. 1 illustrates an example environment 100 in which techniques enabling a refined search with machine learning can be embodied. The environment 100 includes an example computing device 102 having one or more computer processors 104 and computer-readable media 106, which includes memory media and storage media. The computer-readable media 106 includes a search manager 108, various applications 110, and an operating system (not shown), which are embodied as computer-readable instructions. The search manager 108 includes, or has access to, a search engine 112 having a machine-learning component 114, and a search interface 116. The environment 100 also includes an example remote device 118, which includes one or more remote computer processors 120 and remote computer-readable media (CRM) 122. The remote CRM 122 may include, alternatively or in addition to the computer device 102, the search engine 112 and the machine-learning component 114.

Generally, the search manager 108 works with the search engine 112 and the search interface 116 to receive search criteria, perform searches, and provide search results. This may include enabling selection of one of the search criteria by which to revise the search, as well as determine whether the revised search results were positively or negatively received by the user. The search manager 108 can provide this information to the search engine 112, thereby enabling the search engine 112 to alter and improve the machine-learning component 114. By so doing, future searches can be more effective and more-often positively received by the user or other users, saving users time and improving their experience.

The computing device 102, as well as the remote computing device 118, may include a network interface 124 for communicating data over wired, wireless, or optical networks. The network interface 124 may communicate data over network 126, such as a local-area-network (LAN), a wireless local-area-network (WLAN), a personal-area-network (PAN), a wide-area-network (WAN), an intranet, the Internet, a peer-to-peer network, point-to-point network, a mesh network, and the like. The computing device 102 also includes, or is able to communicate with, a display 128, such as one of those shown in FIG. 1.

Example configurations of the computing device 102 are shown in FIG. 1, such as a smartphone 102-1, computing spectacles 102-2, a laptop 102-3, a refrigerator 102-4, and a television 102-5. Other devices may also be used, such as home automation and control systems, entertainment systems, audio systems, desktop computers, other home appliances, security systems, netbooks, smartphones, automobiles, small wearable computers, and e-readers. Note that the computing device 102 can be wearable, non-wearable but mobile, or relatively immobile (e.g., desktops and appliances).

These and other capabilities and configurations, as well as ways in which entities of FIG. 1 act and interact, are set forth in greater detail below. These entities may be further divided, combined, and so on. The environment 100 of FIG. 1 and the detailed illustrations of the following figures show some of many possible interfaces, environments, and devices capable of employing the described techniques.

Example Methods

Figure 2:
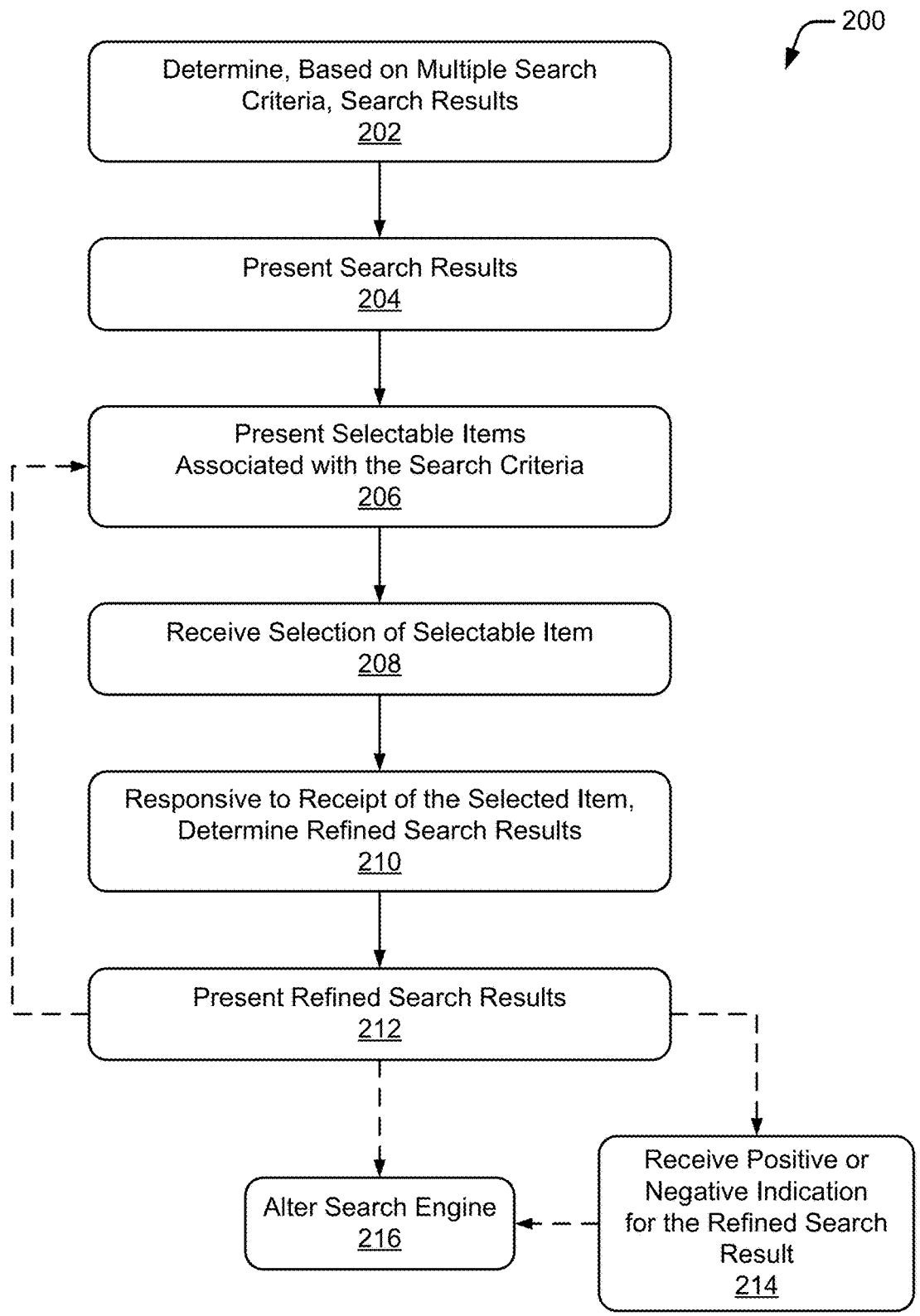
FIG. 2 illustrates an example method for performing a search and a refined search, optionally including altering a search engine.
Figure 6:
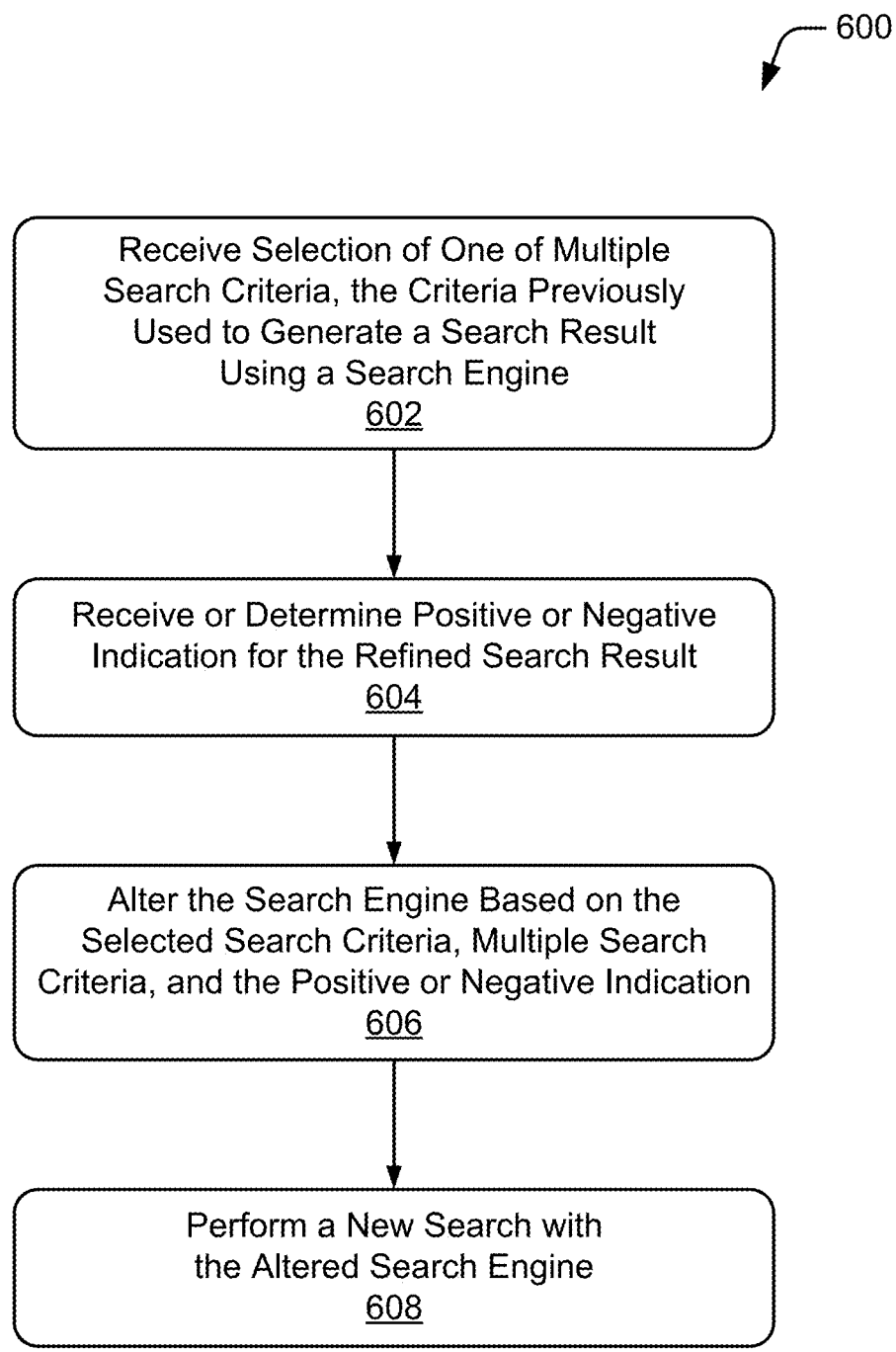
FIG. 6 illustrates an example method for altering a search engine to improve the search engine's performance based on selected search criteria and positive or negative indications from a user responding to a refined search result.

FIGS. 2 and 6 depict methods enabling a refined search with machine learning. Method 200 in FIG. 2 performs a refined search based on selection of a prior search's search criteria. Method 600 in FIG. 6 alters a search engine to improve performance based on selected search criteria and positive or negative indications from a user responsive to a refined search based on the selected search criteria.

These methods are shown as sets of operations or acts performed but are not necessarily limited to the order or combinations in which the operations are shown herein. Further, any of one or more of the operations may be repeated, combined, reorganized, or linked to provide a wide array of additional and/or alternate methods. In portions of the following discussion reference may be made to environment 100 of FIG. 1, reference to which is made for example only. The techniques are not limited to performance by one entity or multiple entities operating on one device.

At 202, search results are determined based on multiple search criteria. The search criteria used can be received in various manners, such as actively through an audio-reception system, a touch screen, keyboard, and so forth. The search criteria can instead, or also, be passively received (or determined) based on a user's history, device, or actions, such as reading an email, making a phone call, or looking at a webpage. For example, a search query can be received as a typed-in text, a spoken query, or determined from a user's actions. If a user selects to read a webpage, the text associated with the webpage can be used to provide search results, even if the user did not explicitly request search results. Thus, the number and type of search criteria available to the search engine 112 can be immense, making it difficult to determine what to use, how to confidence (or assign a confidence), balance, and correlate it, and so forth.

Figure 3:
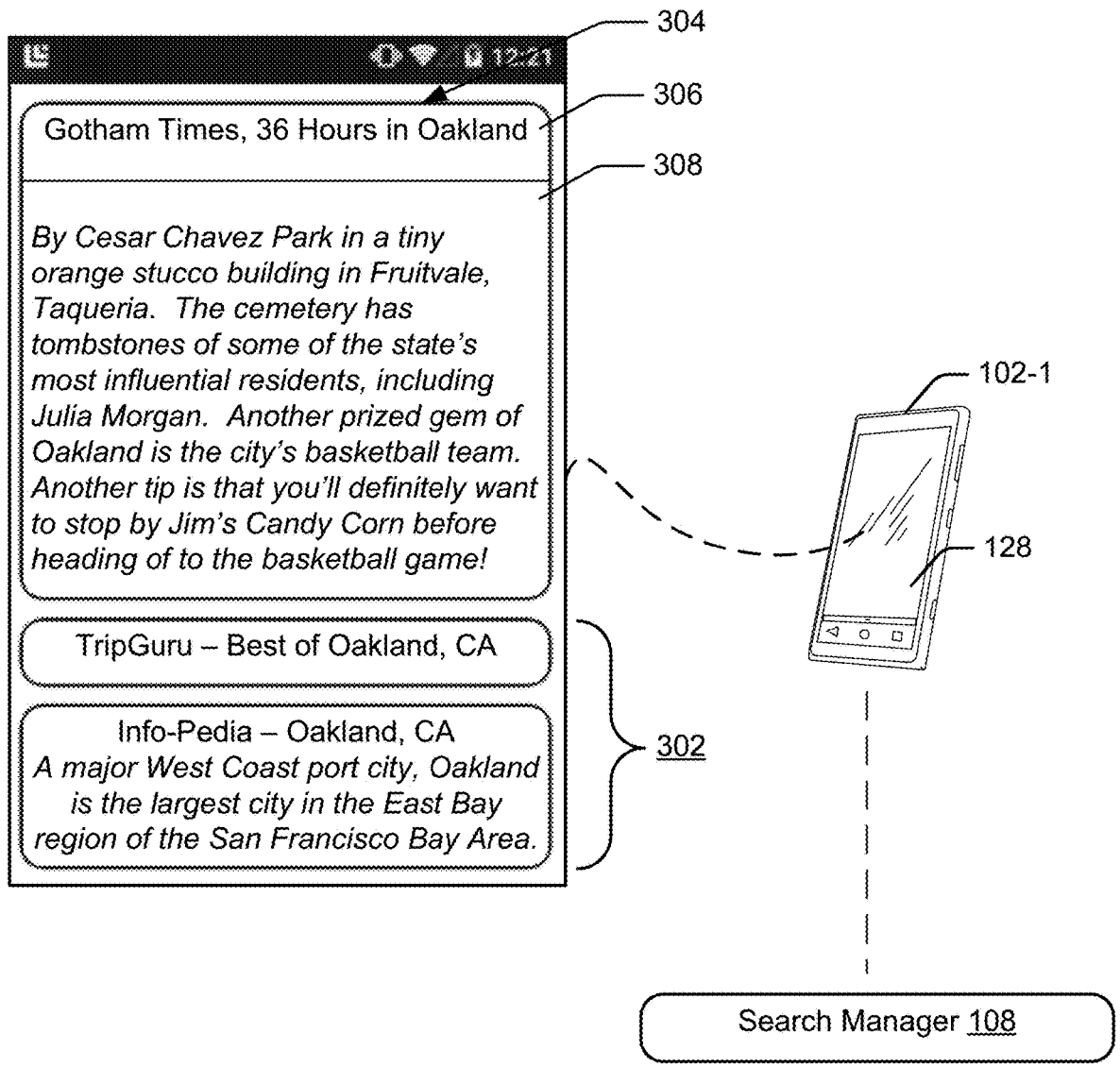
FIG. 3 illustrates search results based on an article read by a user of the computing device.

At 204, the search results are presented. By way of an ongoing example, assume that the user in the Gotham Times example above is instead using the computing device 102, which includes the search manager 108. The search manager 108, at operations 202 and 204, determines and presents search results 302 based on an article 304 being read by the user, illustrated in FIG. 3. FIG. 3 shows the article 304, its title 306, and text in a body 308 of the article 304. For this example assume that the user is not interested in the search results 302.

At 206, selectable items associated with the multiple search criteria are presented. These selectable items can be presented in various manners, such as in a unique user interface, in a same interface as the search results, or by altering or overlaying an interface on search criteria even if those criteria were passively selected by the techniques. As noted in part above, the search criteria can be text from a text-based document selected for presentation by the user. In such a case, one or more of the selectable items can be presented by highlighting the text, and making it independently selectable, from within the text-based document (e.g., an email, word-processing document, e-book, or webpage).

Figure 4:
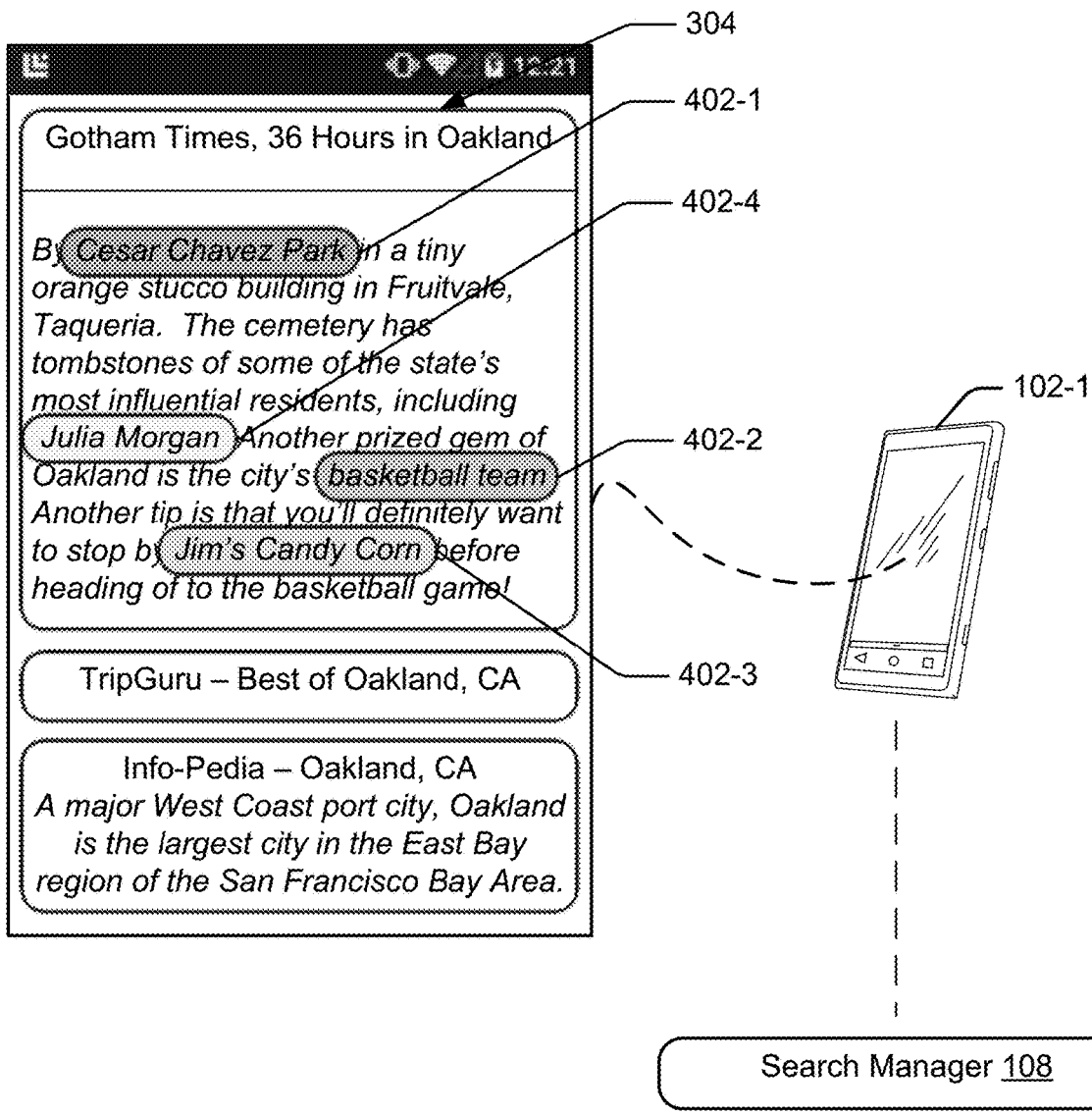
FIG. 4 illustrates selectable controls for items shown in the search results of FIG. 3.

Continuing the ongoing example, the search manager 108 presents some, but not all, of the search criteria used to generate the search results 302, as shown in FIG. 3. Here, the search criteria are, in order of confidence (e.g., the confidence or search value assigned to each of the search criteria), Oakland, Calif., Cesar Chavez Park, the Oakland Basketball Team, Jim's Candy Corn, and Julia Morgan. The search manager 108, through the search interface 116, presents selectable controls 402-1, 402-2, 402-3, and 402-4 in FIG. 4, for each of the four lower-confidence search criteria, thereby excluding selection of the highest-confidence criteria (Oakland). While not required, the search interface 116 may show some sort of visual representation to indicate the relative confidence of the selectable search criteria, an example of which is shown in FIG. 4 with darker shading for the controls 402 indicating a higher confidence. These controls can be part of the webpage, another application, presented through an application programming interface (API), or be an overlay that may or may not look like a separate interface. In this example, the search interface 116 presents selectable controls as an overlay on the webpage.

At 208, selection of one of the selectable items is received. Selection can be received in the various manners described above, such as tapping on a control associated with a search criterion presented in a user interface, speaking selection of a text-based item associated with a search criterion, and so forth. Continuing the ongoing example, assume that the user taps on the control 402-4, which is associated with the low-confidence search criteria Julia Morgan. Thus, this selection is received by the search interface 116, and will be used by the search manager 108 as noted below.

At 210, refined search results are determined responsive to receipt of the selected item. Thus, with the user's selection to up-confidence (or down-confidence) one of the search criteria used in the previous search, the techniques can refine, or re-run the search, sufficient to provide refined search results. While not required, the techniques may use one or more of the unselected prior search criteria in performing the refined search. In many cases, the prior search assigned a confidence or in some way treated different each of the search criteria and, thus, the items presented were associated with search criteria that had varying confidence. In such a case, selection of a search criteria through a selectable item alters that confidence or treatment relative to at least one of the other, unselected search criteria. This selection to alter the confidence can be as simple as tapping on highlighted text, similar to as shown above, but it may also be more advanced. More-advanced selection can include moving the items in the user interface to set their confidence (e.g., importance or value to the ultimate results presented), such as top-to-bottom. Or an item can be selected and dropped (removed from the search), or simply up-confidenced by a small amount. Further still, the search interface 116 can enable a user to vary a confidence in a continual manner, such as with a slider or movement of the item up the display. As the item's confidence is adjusted in the movement up the screen, the search manager 108 can continue to present and alter the refined search results in real time.

Figure 5:
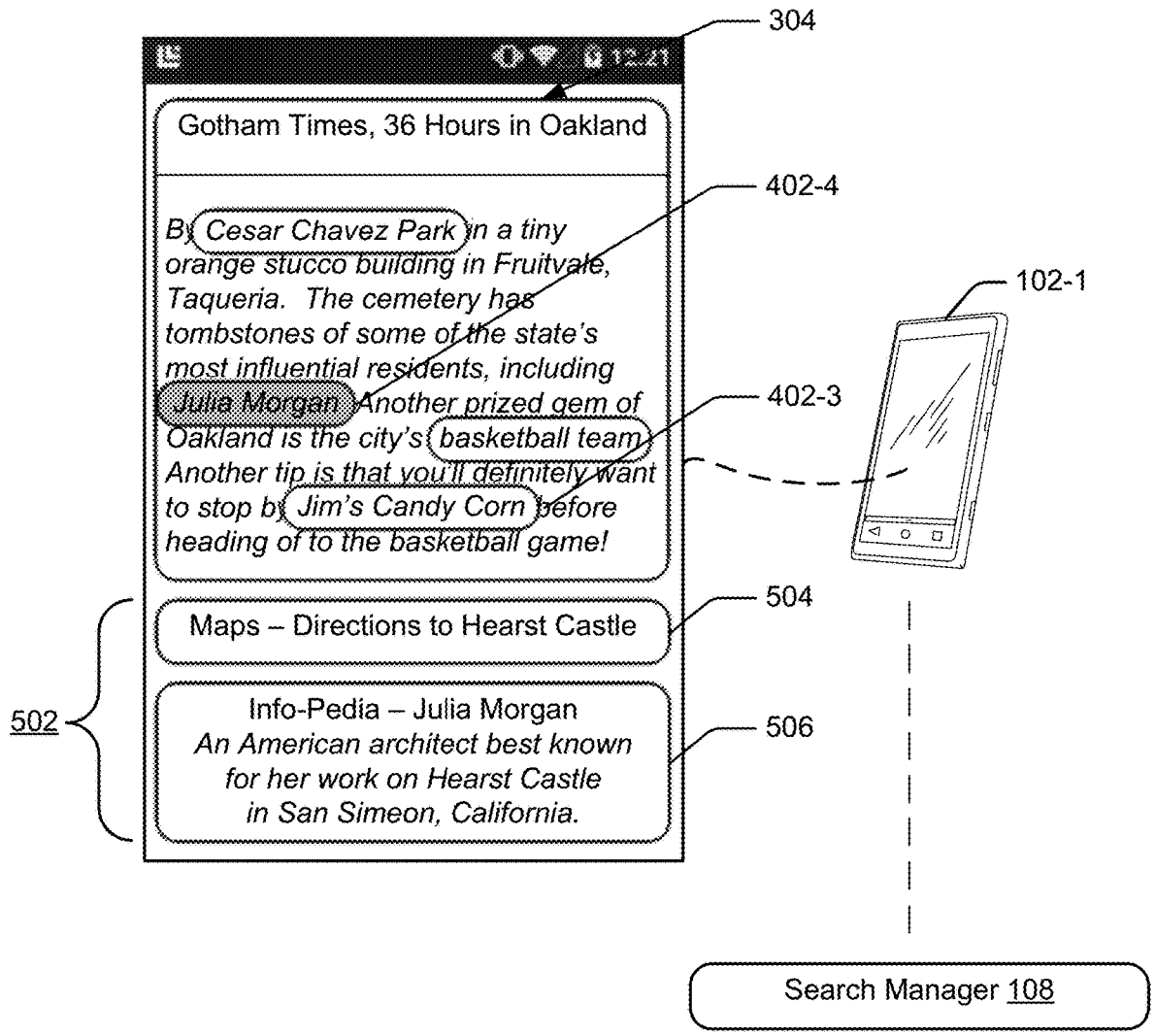
FIG. 5 illustrates selection of one of the controls shown in FIG. 4, the control associated with Julia Morgan.

At 212, the refined search results are presented. These refined search results can be presented in the same user interface as the selection was made, in a common search results area on the display, or in various manners for presenting search results. Continuing the ongoing example, consider FIG. 5, which illustrates the selection of the control 402-4 associated with Julia Morgan, and presentation of refined search results 502. Note that the refined search results 502 show two items associated with the selected search criteria, Julia Morgan, but other search criteria can be used, even if the confidence of these is lower than the selected criteria. Thus, in this example, Oakland, Calif. is still used in the refined search and, thus, other buildings designed by Julia Morgan that are not near Oakland are not included in direction results 504. The information about Julia Morgan, shown with the Info-Pedia results 506 does not rely on the Oakland search criteria. Note that this is one way that the search manager 108 may use a selection to refine the search results, or may instead rely fully or nearly fully on the selected search criteria.

Optionally, the techniques may repeat portions of the method, such as to again present selectable items, and thus re-perform operations 206, 208, 210, and 212, to further refine the search results (shown with a dashed-line from 212 to 206). As noted, this can be through as little as a tap gesture on an item, or can be iteratively performed even in real time, with the movement or other continuing adjustment to the confidence of an item through user selection.

As noted above, the refined search results, and the selection made by the user to instigate the refined search, can be used to alter a search engine. Thus, optionally at 214, a positive or negative indication for the refined search result can be received. This indication can be used, along with the selected search criteria, to alter a search engine at 216. This alteration does not require an indication, but may instead simply use the fact that the search criteria was selected.

Concluding the ongoing example, the selection of the control 402-4 for Julia Morgan, can be used by the machine-learning component 114 to alter the search engine 112. Also, however, a user's indication of the refined search results being desired can help the machine-learning component 114 learn how best to alter the search engine 112. Thus, if the user selected another search criterion, e.g., Jim's Candy Corn, shown in FIGS. 4 and 5, the machine-learning component 114 may determine that the refined search results were not desired. If, however, the user reads the refined search results, or does not refine further, or selects the results (e.g., to get directions or read the full article on Julia Morgan in Info-Pedia), these are positive indications that the refined search results were desired. Such a determination can be used for later searches or refined searches. Ways in which the techniques use machine learning are set forth in greater detail with method 600 below.

As shown in FIG. 6, method 600 alters a search engine to improve performance based on selected search criteria and positive or negative indications from a user responsive to a refined search result.

At 602, selection of one of multiple search criteria is received. The multiple search criteria from which the selection is made were previously used to generate a search result using a search engine. Similar to some aspects of the method 200, the search result was previously, or is concurrently, provided through a device at which selection of the one of the multiple search criteria is received. Manners in which these can be presented, selection enabled, and so forth are set forth above. Thus, operations of the method 200 may precede or be interlaced with operations of the method 600.

At 604, a positive or negative indication is received or determined for a refined search result. The refined search result is generated based on the selected search criteria, similar to operations of the method 200. Also, the refined search result can be provided through the device at which the positive or negative indication for the refined result is received or determined.

In more detail, a positive indication can be determined based on a selection of, or action based on, the refined search result. Thus, in the example above, if the search interface 116 (or some other interface from which data can be received) receives a selection to view the refined search results without a divergent new search being requested, this can be considered a positive indication that the search engine 112 provided a desired result.

In regards to a negative indication, the negative indication can be determined based on the user selecting a different search criteria or entry of a new search. Or, if the user does not interact with the refined search results or the search is totally unrelated, this indicates a lack of interest. If the search or the refined search asks for more about Julia Morgan, then the selection may indicate that the refined search result was not sufficient or desired.

In some cases, the indication is more complex than positive or negative, however. Thus, if a user viewing the refined search result selects to learn more about Julia Morgan's life, directions to her museum, or a book she wrote, this may indicate a positive or negative indication in part. It can be viewed as positive in that it spurred further interest, and thus it may have been a desirable and useful refined search result. It can be viewed negatively in that the information provided by the refined search result was deemed insufficient by the user, otherwise he or she would not have selected to learn something different from the search (often through another search or an updated search that looks for something different rather than deeper into the same topic). Through this analysis of the user's actions and the selected search criteria, future searches can be improved by the machine-learning component 114.

At 606, the search engine is altered based on the selected search criteria, the multiple search criteria, and the positive or negative indication for the refined search result. As noted, the indication can be partly positive and negative, or just be complex and usable even with the complexity. Thus, if an indication is for a follow-up or further refined search, the machine-learning component 114 may alter the search engine 112 so that future searches add some of the information from the further-refined search, as well as indicate that the refined search was positive and, thus, that the selected search criteria should be assigned a higher confidence in the original search.

As shown in FIG. 1, the search engine 112 and the machine-learning component 114 can be located, or operate at, the local device (computing device 102) on which the user acts or a remote computing device 118. Thus, the search engine 112 being altered can be remote, local, or both. The alterations can be universal, thereby applying to the search engine 112 generally, or specific to the user that made the selection.

At 608, a new search is performed with the altered search engine. With the alteration to the search engine 212 by the machine-learning component 114, the search engine 212 behaves differently, in at least some cases, than before the alteration. Here, a new search is performed differently than it would have been before the alteration to the search engine. This alteration can be reflected as up-confidence or down-confidence of a search criteria based on the selection of the search criteria (or other search criteria that were not selected), the refined search results, and the indication of how those refined search results was regarded by the user. As noted, the effect of the selected search criteria need not be as simple as assigning a confidence, as there are often complex relationships taken into account with search engines, which can often be the case with an alteration by the techniques.

Figure 7:
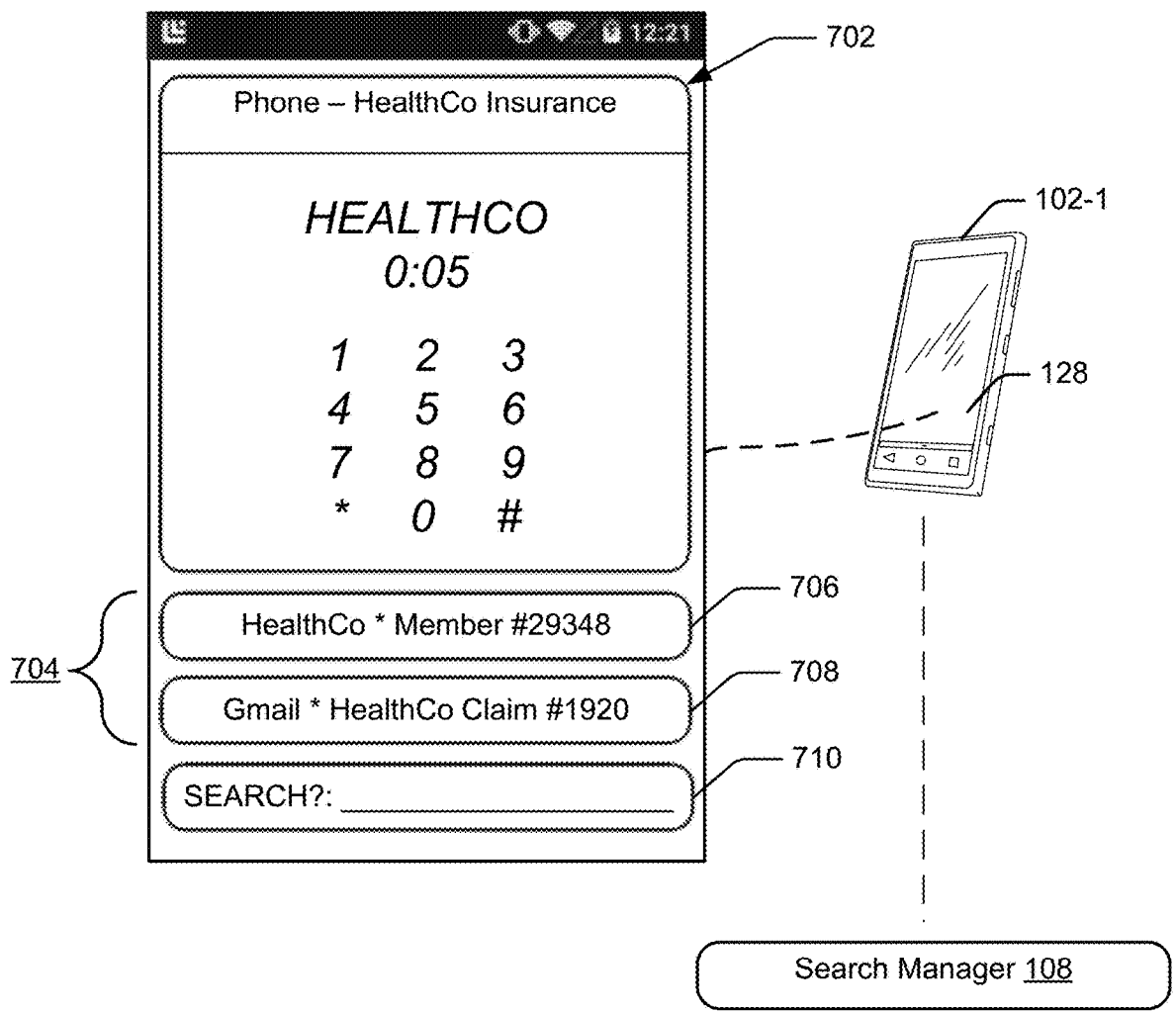
FIG. 7 illustrates the computing device of FIG. 1 showing a call in progress and search results based on the phone call being made.

By way of example, consider FIG. 7, which shows one example way in which the operations of the method 600, and portions of the method 200, act and interact. Here, the elements of the example environment 100 of FIG. 1 are described as the actors, though this is not required. FIG. 7 illustrates the computing device 102 (here the smartphone 102-1), having the display 128, as well as a call interface 702. This call interface 702 shows a phone call, in progress, with a company called HealthCo, an insurance company.

Prior to 602, such as operations 202 and 204 of the method 200, the search criteria are determined and used, by the search manager 108, to provide search results 704. Here, no search terms were explicitly entered by a user. Instead, the search manager 108 determined that the search criteria are the call itself, the calling entity (the user), and the entity being called, namely HealthCo. Based on these search criteria, the search manager 108 performs a search locally and non-locally, with, in this case, the top two results being from local sources for the user (her email) in which a claim number is found, and in her electronic wallet, where her member number is found. Thus, the search manager 108 presents search results 704, with two different sets of data from two different applications, shown at first result 706 and second result 708. The search manager 108 also provides a search field 710 for the user's convenience.

Figure 8:
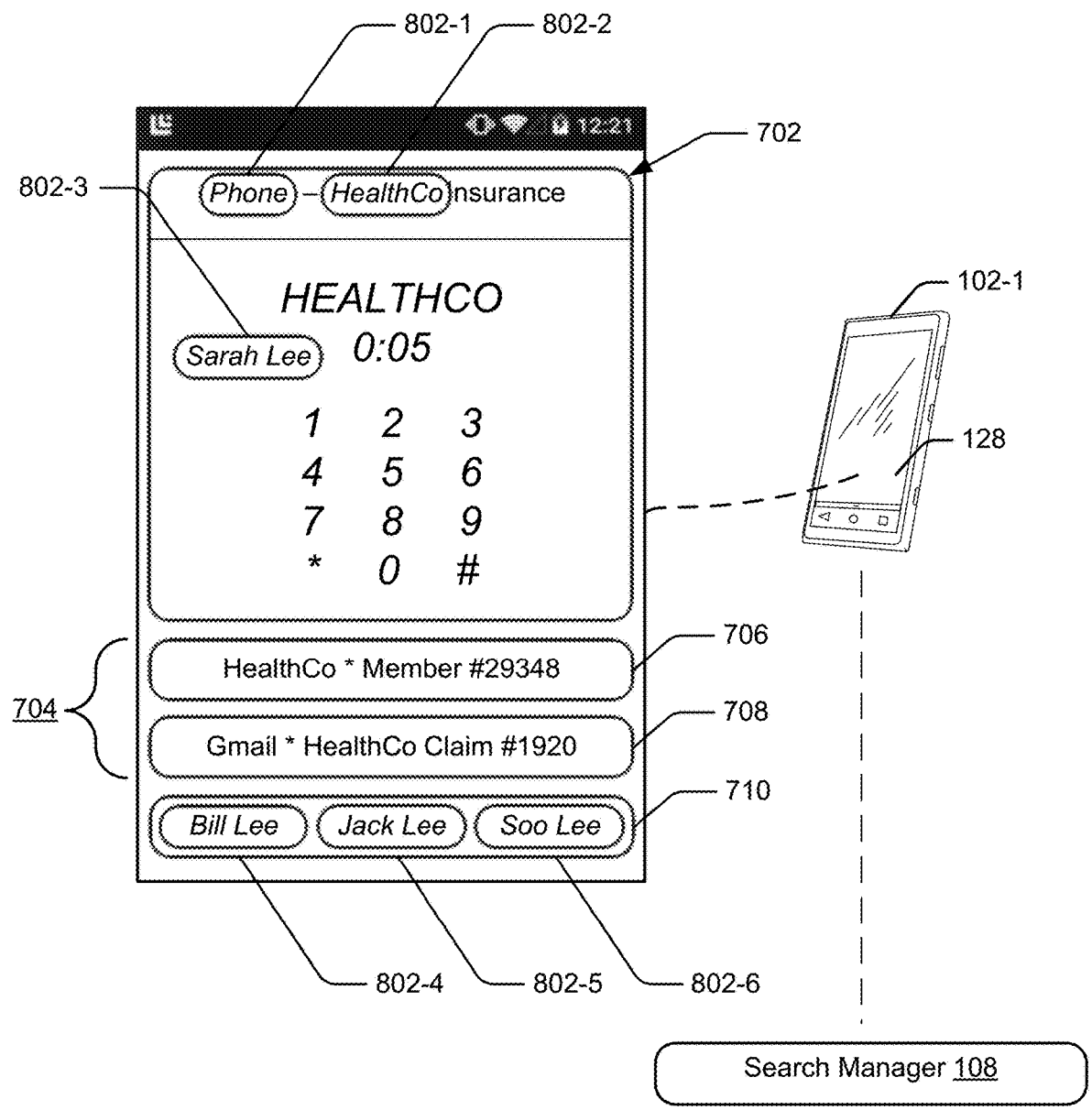
FIG. 8 illustrates selectable controls for search criteria used to provide the search results shown in FIG. 7.

Similarly to the described example in FIGS. 2-5, consider FIG. 8, which illustrates selectable controls for the search criteria, here including six search criteria that are related to a prior action of the user and search criteria found based on those actions. Thus, the call is a prior action, the user's identity is context, the entity being called is a prior action, and Sarah Lee's husband and two parents are search criteria determined to be relevant and used in the search, but of lower importance. These controls are shown at 802-1, 802-2, 802-3, 802-4, 802-5, and 802-6, which correspond to the call itself (shown with the phone control), the entity being called, HealthCo, a caller entity Sarah Lee, her husband, mother, and father, respectively. While not required, the final three search criteria can be presented automatically or responsive to a selection to tap or touch the search field 710, as interaction with the search field 710 may indicate a desire by the user for even lower-relevance search criteria than those immediately shown.

Figure 9:
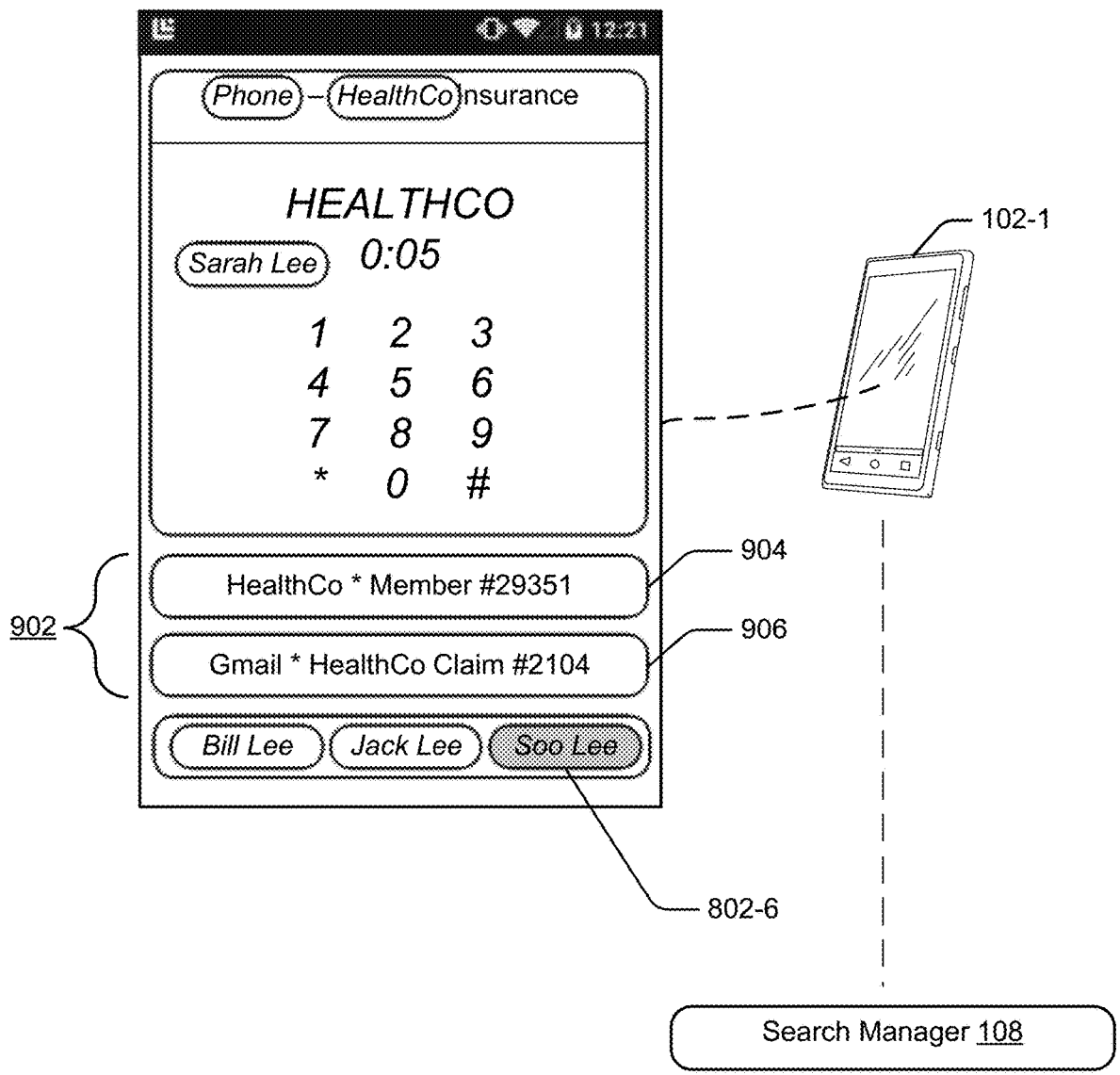
FIG. 9 illustrates a revised search result based on a selected search criterion.

A selection of one of the multiple search criteria is received by the search interface 116 at operation 602. The search criteria selected is Sarah Lee's mother, Soo, with selectable control 802-6. Thus, in response, the refined search provides Soo's member number and a claim number associated with Soo, rather than Sarah, which is shown in FIG. 9 at refined search results 902. The refined search results 902 show Soo's member number at refined result 904 and Soo's claim number at refined result 906. This can all be performed during the call, permitting the user to easily talk with the entity with the relevant information. Further still, at operation 604, assume a positive indication is received by the search interface 116 by receiving an audible indication that the refined search results are correct, e.g., hearing the user recite the member and claim number for Soo.

Concluding the example, at 606 the machine-learning component 114 alters the search engine 112 to add greater confidence, or otherwise increase the value, for the algorithm, at least when a user is calling a health-related company. This alteration increases the likelihood that a future user's parent's data is presented when the user calls a health-related company.

In some cases, as illustrated in FIG. 1, the search engine 112 is remote from the computing device 102, and is instead operating at the remove device 118, in whole or in part. In such a case, the computing device 102 and the remote device 118 are in communication using the network interface 124 and the network 126. In the context of the methods 200 and 600, the determination of the search results and refined search results are preformed remotely at the remote device 118. In such a case, the remote device 118 receives information from the computing device 102, such as search criteria or selected search criteria, and in response provides search results or revised search results, respectively. These are provided for display by the computing device 102 to the user. The positive or negative indication can be received from the computing device 102 by the remote computing device 118, after which the search engine 112 can be altered by the machine-learning component 114. In cases where the search engine 112 is altered differently for a particular user, rather than for all or nearly all users (e.g., those that request searches through the Internet from the search engine provider), that difference can be reflected locally at the computing device 102 or remotely, through association of that difference with the particular user or the particular user device (here the computing device 102).

The preceding discussion describes methods relating to a refined search with machine learning. Aspects of these methods may be implemented in hardware (e.g., fixed logic circuitry), firmware, software, manual processing, or any combination thereof. These techniques may be embodied on one or more of the entities shown in FIGS. 1 and 10 (electronic device 1000 is described in FIG. 10 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Electronic Device

Figure 10:
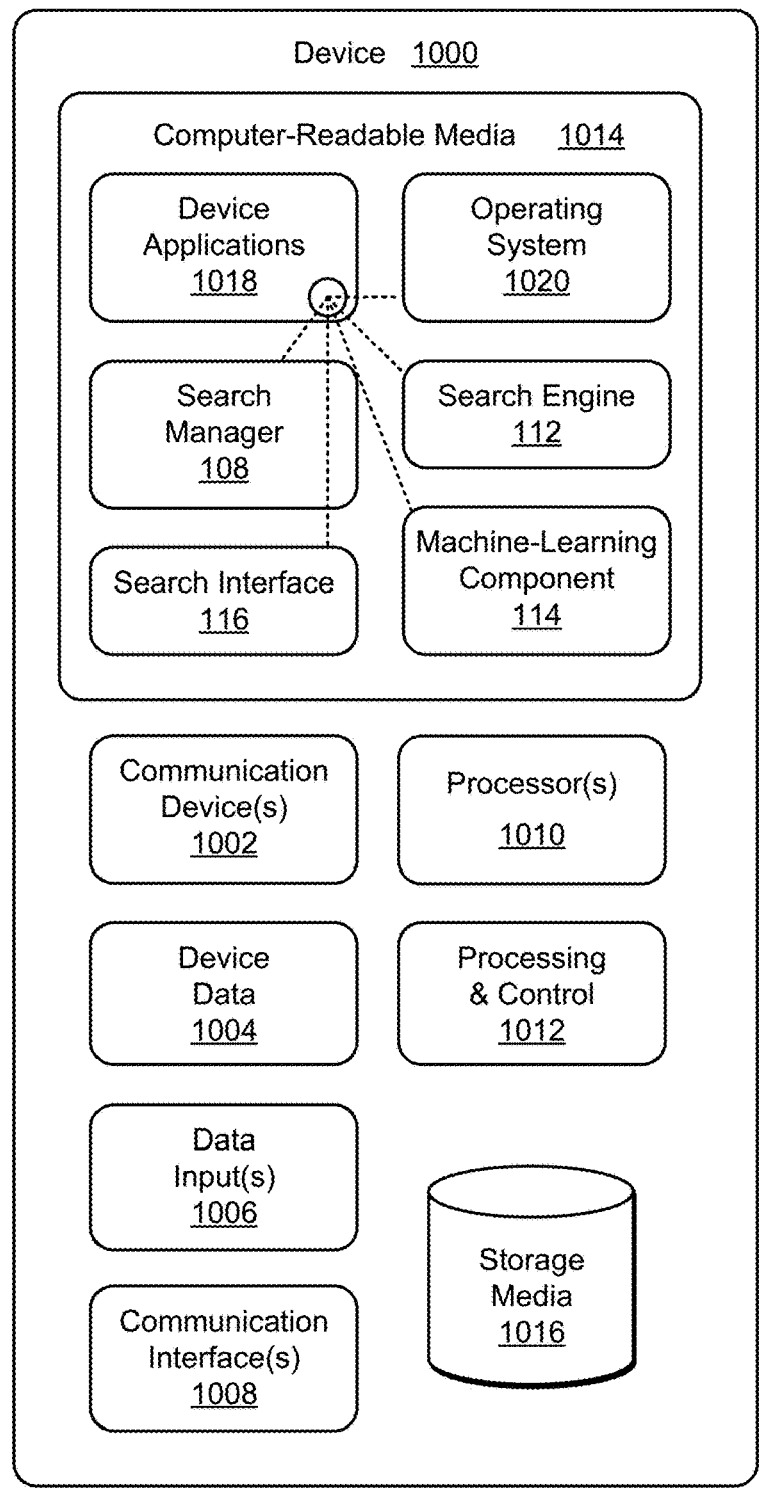
FIG. 10 illustrates an example electronic device enabling, or in which techniques may be implemented that enable use of, a refined search with machine learning.

FIG. 10 illustrates various components of example electronic device 1000 (the device 1000) that can be implemented as any type of client, server, and/or computing device as described with reference to the previous FIGS. 1-9 to implement a refined search with machine learning.

The device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device (e.g., an identity of an actor performing an action). Media content stored on the device 1000 can include any type of audio, video, and/or image data. The device 1000 includes one or more data inputs 1006 via which any type of data, media content, and/or inputs can be received, such as human utterances, interactions with a radar or other sensor field, user-selectable inputs (explicit or implicit), messages, music, television media content, recorded video content, and any other type of audio, video, and/or image data received from any content and/or data source.

The device 1000 also includes communication interfaces 1008, which can be implemented as any one or more of a serial and/or parallel interface, a wireless interface, any type of network interface, a modem, and as any other type of communication interface. Communication interfaces 1008 provide a connection and/or communication links between the device 1000 and a communication network by which other electronic, computing, and communication devices communicate data with the device 1000.

The device 1000 includes one or more processors 1010 (e.g., any of microprocessors, controllers, and the like), which process various computer-executable instructions to provide a computer-implemented method to control the operation of the device 1000 and to enable techniques for, or in which can be embodied, refined search with machine learning. Alternatively or in addition, the device 1000 can be implemented with any one or combination of hardware, firmware, or fixed logic circuitry that is implemented in connection with processing and control circuits which are generally identified at 1012. Although not shown, the device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1000 also includes computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The device 1000 can also include a mass storage media device (storage media) 1016.

Computer-readable media 1014 provides data storage mechanisms to store the device data 1004, as well as various device applications 1018 and any other types of information and/or data related to operational aspects of the device 1000. For example, an operating system 1020 can be maintained as a computer application with computer-readable media 1014 and executed on the processors 1010. The device applications 1018 may include a device manager, such as any form of a control application, software application, signal-processing and control module, code that is native to a particular device, a hardware abstraction layer for a particular device, and so on. The device applications 1018 also include system components, engines, or managers to implement refined search with machine learning, such as the search manager 108, the search engine 112, the machine-learning component 114, and the search interface 116.

Further to the descriptions above, a user may be provided with controls allowing the user to make an election as to both if and when systems, programs or features described herein may enable collection of user information (e.g., information about a user's search selections, search refinements, social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Conclusion

Although aspects of techniques enabling a refined search with machine learning have been described in language specific to features and/or methods, it is to be understood that the subject of the appended claims is not necessarily limited to the specific features or methods described. Rather, the specific features and methods are disclosed as example implementations of ways in which to perform a refined search with machine learning.

What is claimed is:
1. A computer-implemented method comprising:
displaying text provided by a first application in a portion of a display associated with the first application;
passively receiving search criteria that include a portion of the text provided by the first application and displayed in the portion of the display;
determining, from among the passively-received search criteria, multiple search criteria for a search based on a user history or a user device;
determining, based on the determined multiple search criteria, search results;
presenting selectable items associated with the determined multiple search criteria, the selectable items include highlighting, and making independently selectable, the portion of the text provided by the first application;
receiving selection of one of the selectable items;
responsive to receipt of the selected item, determining refined search results, the refined search results based on a search criterion associated with the selected item and at least one other of the determined multiple search criteria;
responsive to the determining of the refined search results and without an explicit request for the refined search results by a user, selecting a second application based at least in part on the portion of the text; and
presenting the refined search results in another portion of the display associated with the second application.

2. The computer-implemented method as described in claim 1, wherein the selectable items are associated with lower-confidence search criteria of the determined multiple search criteria, the lower-confidence search criteria having a lower confidence than at least one higher-confidence search criteria of the determined multiple search criteria, the at least one higher-confidence search criteria not being selectable.

3. The computer-implemented method as described in claim 1, the method further comprising altering a search engine based on the selection of the selected item.

4. The computer-implemented method as described in claim 3, wherein altering the search engine is further based on a positive or negative indication associated with the refined search results.

5. The computer-implemented method as described in claim 1, wherein:
determining the search results comprises assigning varying confidence to the determined multiple search criteria;
presenting the selectable items associated with the determined multiple search criteria used to determine the results comprises presenting the selectable items associated with those of the determined multiple search criteria that were assigned varying confidence; and
determining the refined search results comprises assigning a higher confidence IO to the determined multiple search criteria associated with the selected item for the determination of the refined search results than the determination of the search results.

6. The computer-implemented method as described in claim 1, wherein the explicit request for search results by the user includes search terms entered by the user.

7. The computer-implemented method as described in claim 1, wherein presenting the selectable items comprises presenting a visual representation of a confidence for each of the determined multiple search criteria associated with the selectable items.

8. The computer-implemented method as described in claim 1, wherein receiving the selection of the selected item comprises receiving the selection based on a tap gesture made on the selectable item.

9. The computer-implemented method as described in claim 1, the method further comprising:
   determining multiple other refined search results; and
   presenting the multiple other refined search results in real time responsive to movement or other continuing adjustment of a confidence of the selected item, the movement or other continuing adjustment received through a user selection of one of the selectable items.

10. A computer-implemented method comprising:
   displaying text provided by a first application in a portion of a display associated with the first application;
   passively receiving search criteria that include a portion of the text provided by the first application and displayed in the portion of the display;
   determining, from among the passively-received search criteria, multiple search criteria based on a user history or a user device;
   receiving a selection of one of the determined multiple search criteria, the determined multiple search criteria previously used to generate a search result by a second application and using a search engine, the portion of the text provided by the first application presented as selectable items that include highlighting of the portion of the text, the search result previously or concurrently provided through a device at which selection of the one of the determined multiple search criteria is received and presented in another portion of the display associated with the second application, the search result provided responsive to a generation of the search result and without an explicit request for search results by a user, the second application having been selected based at least in part on the portion of the text;
   receiving a positive or negative indication for a refined search result, the refined search result generated based on the selected search criteria, the refined search result previously or concurrently provided through the device at which the positive or negative indication for the refined search result is determined; and
   altering the search engine based on the selected search criteria, the determined multiple search criteria, and the positive or negative indication for the refined search result.

11. The computer-implemented method as described in claim 10, further comprising, prior to receiving the selection of one of the selectable items, presenting the determined multiple search criteria as selectable controls, at least one of the selectable controls representing a prior user action used as one of the determined multiple search criteria, and wherein the selection is received through selection of the selectable control representing the prior action.

12. The computer-implemented method as described in claim 10, wherein receiving the positive or negative indication comprises receiving the positive indication, the positive indication based on a selection of, or action based on, the refined search result.

13. The computer-implemented method as described in claim 10, wherein receiving the positive or negative indication comprises receiving the negative indication, the negative indication inferred based on a selection of a different search criteria or entry of a new search.

14. The computer-implemented method as described m claim 10, further comprising, prior to receiving the selection, presenting the determined multiple search criteria in a text format with an associated, selectable control, and wherein the selection is received through a selection of one of the selectable controls.

15. The computer-implemented method as described in claim 10, wherein altering the search engine is performed by a machine-learning component, the machine-learning component at a remote device, the remote device being remote to the device on which the selection is received.

16. The computer-implemented method as described in claim 10, wherein:
   the selection of the one of the determined multiple search criteria is received through a same interface in which the search result is concurrently provided; and
   the explicit request for search results by the user includes search terms entered by the user.

17. A system comprising: one or more computer processors; and
   one or more computer-readable media having instructions stored thereon that, responsive to execution by the one or more computer processors, performs operations comprising:
      displaying text provided by a first application in a portion of a display associated with the first application;
      passively receiving search criteria that include a portion of the text provided by the first application and displayed in the portion of the display;
      determining, from among the passively-received search criteria, multiple search criteria for a search based on a user history or a user device;
      determining, using a search engine and based on the determined multiple search criteria, search results;
      responsive to determining the search results and without an explicit request for the search results by a user, providing, by a second application, the search results to the user device for display on the user device results in another portion of the display associated with the second application, the second application having been selected based at least in part on the portion of the text;
      receiving, from the user device, a selection of one of the determined multiple search criteria with which to perform a revised search, the portion of the text provided by the first application being highlighted and presented as selectable items;
      responsive to receipt of the selected search criteria, performing the revised search using the search engine and based on the selected search criteria and one or more other of the determined multiple search criteria to determine refined search results;
      providing, by the second application, the refined search results to the user device for display on the user device in the other portion of the display;
      receiving a positive or negative indication of a desirability of the refined search results from the user device; and
      altering the search engine based on the positive or negative indication and the selected search criteria, the alteration effective to alter the search results for a later determination based on same search criteria as the determined multiple search criteria.

18. The system of claim 17, wherein altering the search engine comprises altering a confidence associated with the selected search criteria when the selected search criteria is used in a future search with at least one of the other of the determined multiple search criteria.

19. The system of claim 17, wherein:
   the selected search criteria is a user history, the user history is used in the determination of the search results; and the explicit request for search results by the user includes search terms entered by the user.

20. The system of claim 17, wherein providing the search results also provides a confidence associated with two or more of the determined multiple search criteria used to determine the search results effective to enable display of a visual indicator for the confidence associated with each of the two or more of the determined multiple search criteria, the determined multiple search criteria including at least one higher-confidence search criteria having a higher confidence than at least one other determined multiple search criteria, the at least one higher-confidence search criteria not being selectable.

* * * * *